(12) United States Patent
Foster (10) Patent No.: US 7,073,394 B2
(45) Date of Patent: Jul. 11, 2006

(54) SCALABLE AVERAGING INSERTION VORTEX FLOW METER

(75) Inventor: Jeffry Duane Foster, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/818,015

(22) Filed: Apr. 5, 2004

(65) Prior Publication Data

US 2005/0217389 A1    Oct. 6, 2005

(51) Int. Cl.
G01F 1/32 (2006.01)
(52) U.S. Cl. .................................................. 73/861.22
(58) Field of Classification Search ............. 73/861.21, 73/861.22, 861.23, 861.24
See application file for complete search history.

(56) References Cited

U.S. PATENT DOCUMENTS

| | | | |
|---|---|---|---|
| 1,935,445 A | 11/1933 | Heinz | 73/167 |
| 3,946,608 A | 3/1976 | Herzl | 73/194 |
| 4,033,189 A | 7/1977 | Herzl | 73/194 |
| 4,169,376 A | 10/1979 | Herzl | 73/194 |
| 4,201,084 A | 5/1980 | Ito et al. | 73/194 |
| 4,339,957 A | 7/1982 | Herzl | 73/861.24 |
| 4,464,939 A | 8/1984 | Corpron | 73/861.24 |
| 4,520,678 A | 6/1985 | Koziol et al. | 73/861.24 |
| 4,526,040 A | 7/1985 | Matsubara | 73/861.24 |
| 4,625,564 A | 12/1986 | Murakami et al. | 73/861.24 |
| 4,633,713 A | 1/1987 | Mesnard et al. | 73/866.5 |
| 4,645,242 A | 2/1987 | Coleman et al. | 285/158 |
| 4,699,012 A | 10/1987 | Lew et al. | 73/861.24 |
| 4,703,659 A | 11/1987 | Lew et al. | 73/861.24 |
| 4,706,503 A | 11/1987 | Kamentser | 73/861.24 |
| 4,717,159 A | 1/1988 | Alston et al. | 277/1 |
| 4,782,710 A | 11/1988 | Nagumo et al. | 73/861.22 |
| 4,791,818 A | 12/1988 | Wilde | 73/861.24 |
| 4,803,870 A | 2/1989 | Lew | 73/861.22 |
| 4,884,441 A | 12/1989 | Lew | 73/195 |
| 4,884,458 A | 12/1989 | Lew | 73/861.24 |
| 4,891,990 A | 1/1990 | Khalifa et al. | 73/861.24 |
| 4,911,019 A | 3/1990 | Lew | 73/861.24 |
| 4,926,532 A | 5/1990 | Phipps et al. | 29/25.35 |
| 4,926,695 A | 5/1990 | Kleven et al. | 73/861.24 |
| 4,972,723 A | 11/1990 | Lew | 73/861.24 |
| 4,973,062 A | 11/1990 | Lew | 73/861.24 |

(Continued)

FOREIGN PATENT DOCUMENTS

GB    823684    11/1959

(Continued)

*Primary Examiner*—Harshad Patel
(74) *Attorney, Agent, or Firm*—Westman, Champlin & Kelly, P.A.

(57) ABSTRACT

An insertion vortex flow meter for measuring a flow rate of a process fluid in a pipe has a mounting assembly, a shedding bar and a sensor assembly. The mounting assembly is attached to a surface of the pipe adjacent an opening in a side wall of the pipe. The shedding bar is inserted through the opening and extends an entire diameter of the pipe. The shedding bar is held in place by a compression force exerted by the sensor assembly on a proximal end of the shedding bar, such that the shedding bar is held by the compressive force between the sensor assembly and an opposing side wall of the pipe. The sensor assembly is adapted to measure motion of a pivoting element corresponding to vortices in the process fluid caused by the shedding bar. The sensor assembly adapted to produce an output indicative of the volumetric flow rate based on the frequency of the measured motion.

24 Claims, 7 Drawing Sheets

U.S. PATENT DOCUMENTS

| | | | |
|---|---|---|---|
| 4,984,471 A | 1/1991 | Storer | 73/861.24 |
| 5,076,105 A | 12/1991 | Lew | 73/861.24 |
| 5,095,760 A | 3/1992 | Lew | 73/861.24 |
| 5,109,704 A | 5/1992 | Lew | 73/861.24 |
| 5,197,336 A | 3/1993 | Tsuruoka et al. | 73/861.24 |
| 5,214,965 A | 6/1993 | Lew | 73/861.24 |
| 5,321,990 A | 6/1994 | Lang et al. | 73/861.24 |
| 5,343,762 A | 9/1994 | Beulke | 73/861.24 |
| 5,396,810 A | 3/1995 | Beulke | 73/861.24 |
| 5,563,350 A * | 10/1996 | Kashimura et al. | 73/861.22 |
| 5,753,826 A * | 5/1998 | Kashimura et al. | 73/861.22 |
| 6,053,053 A | 4/2000 | Huotari | 73/861.22 |
| 6,276,218 B1 * | 8/2001 | Waers | 73/861.22 |
| 6,412,353 B1 | 7/2002 | Kleven et al. | 73/861.22 |
| 6,484,590 B1 * | 11/2002 | Kleven et al. | 73/861.22 |

FOREIGN PATENT DOCUMENTS

| | | |
|---|---|---|
| GB | 1 296 896 | 7/1970 |
| JP | 58160813 | 9/1983 |

* cited by examiner

SCALABLE AVERAGING INSERTION VORTEX FLOW METER

BACKGROUND OF THE INVENTION

The present invention relates to flow meters such as vortex shedding meters or swirl meters, which are responsive to a fluid flow. More particularly, the present invention relates to an insertion vortex meter for use with large diameter pipes.

Generally, flow meters sense the flow of liquids or gases in conduits and produce a signal representative of the flow. One type of flow meter for measuring fluid flow is called a vortex flow meter. The vortex flow meter generally measures the fluid flow by detecting approximately sinusoidal pressure changes created by a moving vortex within the fluid flow.

Generally, the vortex flow meter includes an obstacle known alternatively as a shedding bar, bluff body, or vortex generator. The shedding bar is inserted into the fluid flow causing instability of the flow field. Specifically, the shedding bar splits the flow into two paths around the shedding bar, causing vortices to shed from alternate sides of the object at a frequency linearly proportional to velocity of the flow.

As the bar splits the fluid flow, vortices are created in the fluid flow. These vortices are sometimes referred to as shedding vortices. The shedding vortices produce an alternating differential pressure across the shedding bar at a shedding frequency. This differential pressure is converted into an electrical signal by a piezo-electric sensor. The frequency of the differential pressure or electrical signal is proportional to the velocity of the fluid flow.

In general, vortex meters for larger size fluid conduits tend to be less economical than differential pressure meters or insertion-type meters, in part, because of the large amount of steel or other materials required to produce the standard vortex meter body. In particular, conventional vortex meters are typically sold as a pre-fabricated unit having a pipe section with a flange on each end and a vortex flow meter centered within the pipe section. Such pre-fabricated sections are expensive to produce, because they contain a great deal of metal. Additionally, such sections are expensive to ship because of their weight. Finally, conventional flow meters require that the flow meter be installed between pipes, requiring either that the pipe be cut to insert the flow meter or that the flow meter be installed at the time of the original installation.

There is a need for a vortex-type flow meter that can be produced economically and used with large diameter pipes. There is also a need for a vortex-type flow meter that can be installed into an existing pipe system without having necessarily to stop the fluid flowing within the pipe.

SUMMARY OF THE INVENTION

An insertion vortex flow meter for measuring a flow rate of a process fluid in a pipe includes a mounting assembly, a shedding bar and a sensor assembly. The mounting assembly is attached to a surface of the pipe adjacent an opening in a side wall of the pipe. The shedding bar is inserted through the opening and extends an entire diameter of the pipe. The sensor assembly is electrically connected to the shedding bar and releasably attached to the pipe via the mounting assembly. Installation of the insertion vortex flow meter involves drilling a hole in a sidewall of a pipe, fixing a mounting assembly to the pipe adjacent the hole, inserting the shedding bar through the hole, and attaching the sensor assembly to the mounting assembly.

BRIEF DESCRIPTION OF THE DRAWINGS

FIGS. 7–9D illustrate alternative embodiments of the reinforcement element for supporting the shedding bar of the vortex flow meter assembly.

DETAILED DESCRIPTION OF THE PREFERRED EMBODIMENTS

The present invention is directed to an averaging insertion vortex meter, which solves the problem of high cost by using an insertion technique. In the present invention, the shedding bar of the vortex meter extends across the entire pipe, resulting in an averaging effect. Typical insertion meters, as installed, are inaccurate because they extrapolate a single point velocity measurement into flow over an entire pipe. In theory this works great, but in practice, single point velocity measurements are subject to hundreds of problems that more than double the applied uncertainty of these types of meters. By having a meter that extends across the entire pipe, the insertion-type vortex meter is as accurate as a standard vortex meter in a tradition meter body.

Figure 1:
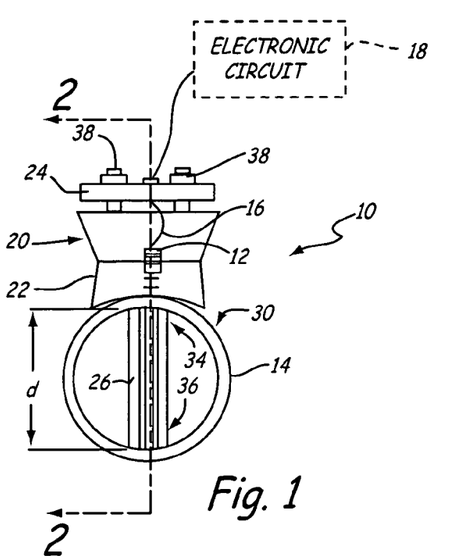
FIG. 1 is a sectional view through a pipe carrying a fluid flow and having a vortex flow meter using a bluff body or shedding bar made according to the present invention.

FIG. 1 illustrates an embodiment of a vortex flow meter of the present invention. Generally, the vortex flow meter assembly 10 includes a vortex sensor 12 that has appropriate mechanical and electrical elements that sense vortices in a fluid flow within a conduit 14. The vortex sensor 12 is operably or electrically coupled (such as by leads 16) to an electronic circuit 18 (shown in phantom). The electronic circuit 18 may be capable of producing both a 4–20 mA current on a current loop indicative of the flow, as well as a square wave output ($F_{out}$) having a frequency proportional to the fluid flow. Alternatively, the electronic circuit 18 may include a wireless transducer (shown in FIG. 5D) for transmitting a signal representative of the flow wirelessly to a control room.

Figure 2:
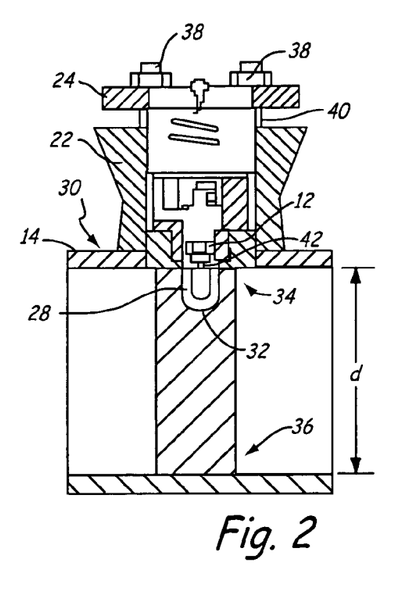
FIG. 2 is a sectional view taken along line 2—2 of FIG. 1.

Generally, the vortex flow meter assembly 10 of the present invention includes a housing 20 having a mounting collar 22 and a cover 24, a vortex generator, bluff body or shedding bar 26, and a pressure bearing element 28 (shown in FIG. 2). The pressure bearing element 28 is sometimes referred to as a "pivoting element". In general, the pressure bearing element 28 moves in response to the fluctuating pressures of the fluid vortices caused by the shedding bar 26.

Figure 3:
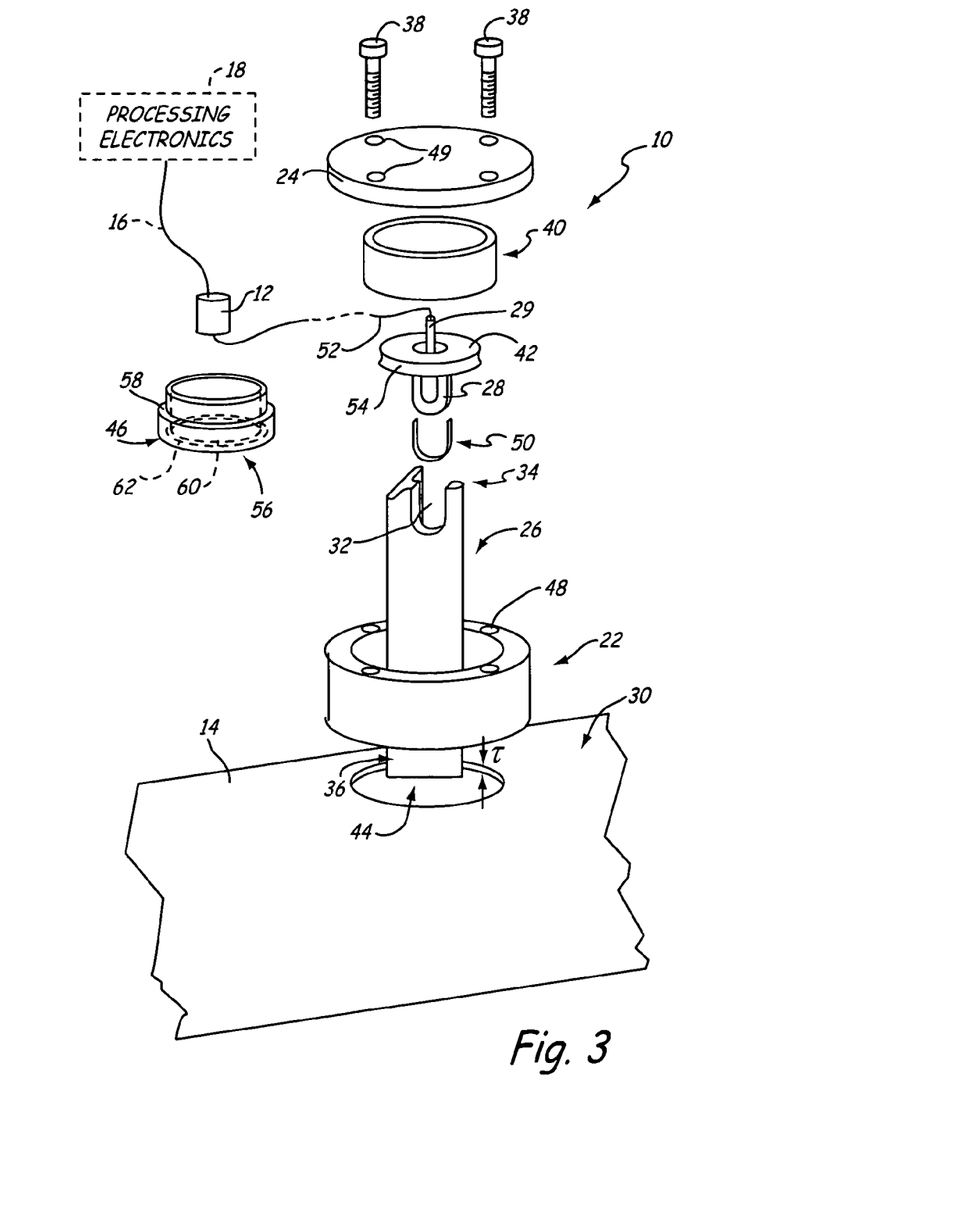
FIG. 3 is an exploded view of the vortex flow meter of the present invention.

The sensor 12 is coupled to the pressure bearing element 28, preferably by attachment to a post (shown in FIG. 3 and indicated by reference numeral 29). The sensor 12 senses the motion of the pressure bearing element 28 via the post 29, and provides an output indicative of the motion. Since the frequency of the motion is a function of the volumetric flow rate, the output is also indicative of the flow.

Generally, the housing 20 is mounted to a pipe 14, and the shedding bar 26 is positioned through an opening in a wall of the pipe 14 and into a fluid flow. When fluid flows past the shedding bar 26, the shedding bar 26 splits the fluid into two flow paths, creating shedding vortices that have a frequency indicative of the flow rate. The vortices cause the pressure bearing element 28 to move with the frequency of the vortices. The sensing device 12 or transducer of the flow meter 10 senses the motion of the pressure bearing element 28 associated with the shedding vortices.

In FIG. 1, the vortex flow meter assembly 10 is shown in situ and mounted to a pipe 14. The flow meter assembly 10 has a shedding bar 26 inserted through an opening (shown in FIG. 3) in a wall of the pipe 14 and extending the entire width of the inner diameter (d) of the pipe 14. The flow meter assembly 10 includes a mounting collar 22, which is welded or otherwise attached to the outer wall 30 of the pipe 14 around an opening (shown in FIG. 3). A pressure bearing element 28 (shown in FIG. 2) is positioned in a cavity 32 in a proximal end 34 of the shedding bar 26. The distal end 36 of the shedding bar 26 is in contact with the inside wall of the pipe 14 on the side of the pipe 14 opposite the opening.

In one embodiment, the sensing device 12 is mechanically connected with the pressure bearing element 28. Leads 16 may extend from the sensing device 12 out from the mounting cover 24 and may be connected to processing electronics or to an electronic circuit 18.

The mounting cover 24 is positioned over the mounting collar 22 and fasteners 38 are used to fix the mounting cover 24 into place. A spacer element 40 may be used to hold a sensor housing for the sensing device 12, which is disposed within the mounting collar 22, in position when the mounting cover 24 is tightened over the mounting collar 22.

Generally, the mounting collar 22 surrounds the opening in the wall of the pipe 14. The pipe end of the mounting collar 22 generally has a surface that is contoured to conform to the curvature of the pipe 14. If the mounting collar 22 extends into the opening, rather than around the opening, the surface may be contoured to conform to the curvature of the inside diameter of the pipe 14. Generally, the mounting collar 22 is welded to the outside surface of the pipe 14.

On an end of the mounting collar 22 opposing the pipe 14, fastener openings (shown in FIG. 3) are provided for receiving the fasteners 38. In this way, the cover 24 can be releasably mounted to the mounting collar 22.

In general, the sensing device 12 is coupled to a pressure bearing component 28, which is inserted in a cavity 32 in the proximal end 34 of the shedding bar 26. The sensing device 12 senses motion of the pressure bearing element 28 relative to the shedding bar 26. The pressure bearing element 28 moves relative to the frequency of the flow vortices formed on opposite sides of the bar 26, and the sensing device 12 measures the motion of the pressure bearing element. The sensing device 12 generates an output that is indicative of the motion of the pressure bearing element, and which is related to the flow of the fluid.

The shedding bar or bluff body may be of any known shape. A preferred embodiment of the shedding bar is taught in U.S. Pat. No. 4,464,939, which is incorporated herein by reference in its entirety.

FIG. 2 shows a cross-sectional side view of the vortex flow meter assembly 10 of the present invention in situ. As shown, the shedding bar 26 extends the entire length of the inner diameter (d) of the pipe 14. A cavity 32 machined into the proximal end 34 of the shedding bar 26 receives the pressure bearing element 28. A mounting collar 22 is fixed to the outside surface 30 of the pipe 14. The sensing element 12 and a portion of the cap 42 are positioned within the mounting collar 22. A spacer 40 is shown between the sensing element 12 and the mounting cover 24. The mounting cover 24 is positioned on top of the spacer 40 and over the mounting collar 22 and attached with fasteners 38 to the mounting collar 22.

In general, the mounting collar 22 holds the sensor housing (shown in FIG. 3 and indicated by reference numeral 46) and the shedding bar 26 in position via pressure applied by the mounting cover 24 through tightening the fasteners 38.

In general, the mounting collar 22 in the embodiment shown is a cylindrical element having an outer diameter and an inner diameter. The inner diameter is sized to receive the spacer 40, the sensor 12 and the cap 42 of the pressure bearing element 28. Additionally, the shedding bar 26 is generally inserted into the mounting collar 22 (which is already attached to the pipe 14) and through an opening in the pipe 14.

It will be understood by workers skilled in the art that the present invention allows for the attachment of a vortex flow meter assembly 10 without requiring an entire pipe section with flange elements for making the necessary attachments. In general, it will be understood that the component elements that make up the flow meter assembly 10 can be produced and sold as individual components or as a complete assembly for insertion into an opening in the pipe 14. An end user can drill the opening, attach the mount collar 22, and insert the shedding bar 26 with the attached sensor 12 into the mount collar 22 and through the opening. It will also be appreciated by a worker skilled in the art that the flow meter assembly 10 of the present invention can be attached to the pipe via any number of techniques and/or attachment means. For example, the flow meter assembly of an embodiment of the present invention can be mounted to the pipe using the "insert/retract mechanism" described in U.S. Pat. No. 4,633,713, which is incorporated herein by reference. Additionally, an embodiment of the present invention can be mounted to the pipe using the method and apparatus of U.S. Pat. No. 4,717,159, which is incorporated herein by reference. One possible embodiment of a method of installation is described with respect to FIG. 4.

Referring now to FIG. 3, an embodiment of the flow meter assembly 10 is shown an exploded view. As previously discussed, an opening 44 is provided in the surface 30 of the pipe 14 extending the entire thickness ($\tau$) of the wall of the pipe 14. A mount collar 22 is provided that is sized to fit around the opening 44. The mount collar 22 is generally a ring-shaped or cylindrical element. The inner diameter of the mount collar is sized to receive a vortex shedder bar 36, a main pressure bearing element 28, a sensor 12, and optionally a sensor housing 46 and a spacer 40. Generally, the sensor device 12 is positioned inside the housing 20 and fixed to the pressure bearing element 28. The sensing device 12 may then be connected by leads 16 (which are shielded) to processing electronics 18.

In this embodiment, the mount collar 22 is provided with fastener openings 48 for receiving a fastener 38 extending through cover openings 49 provided on the mounting cover 24 and into the fastener openings 48 provided on the mount collar 22.

In this embodiment, the shedder bar 26 has a machined cavity 32 or groove sized to receive the pressure bearing element 28. A seal 50 may be positioned between a wall of the cavity 32 and the pressure bearing element 28 to provide a tight fit.

The pressure bearing element 28 includes a pivoting element 31, a cap 42 and a post 29. The post 29 is mechanically connected to a sensing device 12. Depending on the specific assembly 10 sizing and configuration, a groove 54 may be provided on a circumferential edge of the cap 42 for facilitating a weld connection to the sensor housing 46.

The sensor 12 may be positioned within a sensor housing 46. Generally, such a sensor housing 46 is sized to fit within the mounting collar 22. A bottom edge 56 of the sensor housing 46 may be machined to match to curvature of the inner wall of the pipe 14. Additionally, the outer surface of the sensor housing 46 may be provided with a ledge or lip 58 for interfacing with a bottom edge of a spacer. Finally, an inner ring or lip 60 (shown in phantom) may be provided on the inside surface of the sensor housing 46 to mate with a bottom surface of the cap 42 of the pressure bearing element 28.

A ring seal 62 can be used to provide a fluid seal between the fluid flow within the pipe 14 and the sensor 12 by positioning the ring seal 62 on lip 60. In the alternative embodiment, the ring seal 62 is provided on the inside lip (not shown) of the mounting collar 22.

A spacer 40 interfaces with the outside ridge 58 of the sensor housing 46 to translate pressure from the mounting cover 24 onto the seals between the sensor housing and the fluid flow. The pressure exerted by the cover 24 against the spacer 40 maintains the position of the sensor housing 46 and the shedding bar 26. The spacer 40 is generally sized to fit within the inside diameter of the mounting collar 22 and around an outside diameter of at least a portion of the sensor housing 46. Generally, the spacer 40 is positioned to press against the ridge 58 of the sensor housing 46.

The various elements shown in FIG. 3 may be provided as a single pre-fabricated assembly for insertion. For example, the shedding bar 26, the main pressure element 28, the cap 42, and the pressure sensor 12, and the pressure sensor housing 46 can be provided as a single unit. The shedding bar 26, the sensor housing 46 and the pressure bearing element 28 may be cast as a single piece. The mounting collar 22 and cover 24 may be sold separately from the single unit, allowing customers to make their own choice as to how to attach the unit to the pipe 14. Alternatively, all of the components may be sold together.

Figure 4:
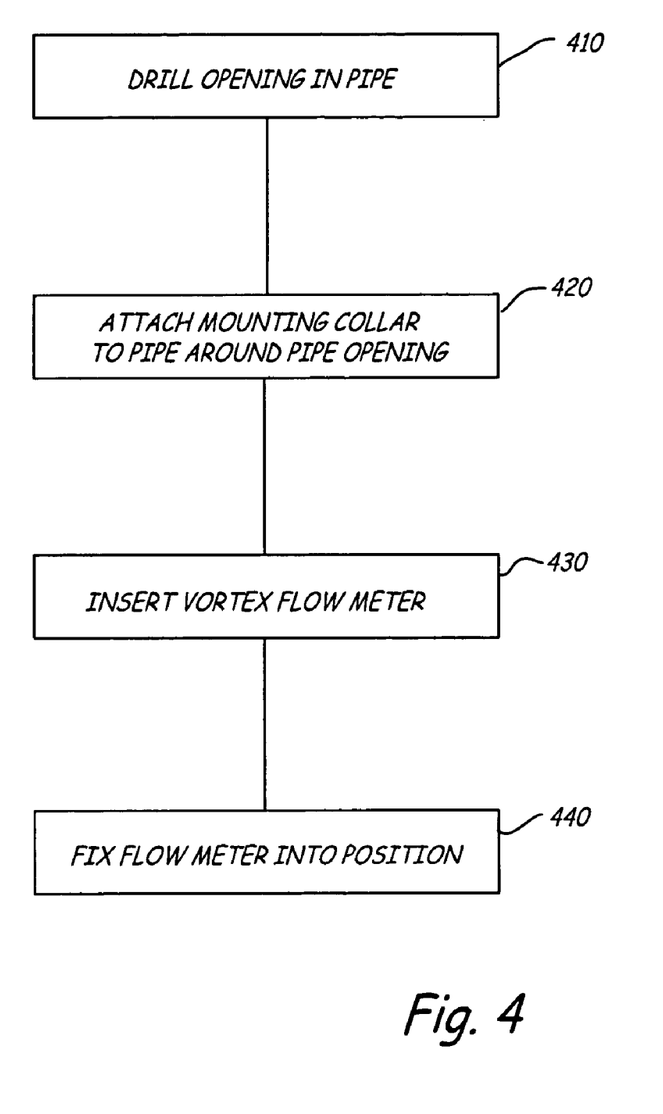
FIG. 4 is a simplified flow diagram of the process of installing the vortex flow meter of FIG. 1.

FIG. 4 shows a simplified flow diagram for installation of the present invention. First, a hole is drilled in one surface of the pipe (step 410). Generally, the hole or opening 44 extends entirely through the thickness (τ) of the pipe 14, allowing access to the fluid flow within the pipe 14. A mounting collar 22 (or flange or bracket) is attached to the pipe 14 around the pipe opening 44 (step 420). Generally, the mounting collar 22 has a ring-shape with an inner diameter sized to allow a vortex flow meter assembly to be inserted into the mounting collar 22 and through the opening 44 in the pipe 14. The vortex assembly is then inserted into the mounting collar 22 through the opening 44 and into the pipe 14, such that the shedding bar 26 extends the entire diameter (d) of the pipe 14 to reach the opposing inner surface of the pipe 14 (step 430).

Finally, spacing element 40 and cover 24 of the mounting collar 22 are fixed in position with fasteners 38 to hold the components in position (step 440).

Figure 5A:
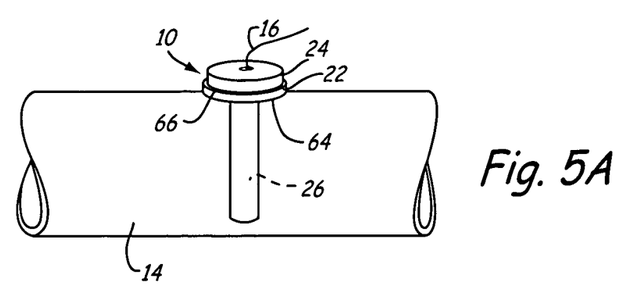
FIGS. 5A–5D illustrate different embodiments showing top plan views of various configurations of the vortex flow meter assembly in situ.

As shown in FIG. 5A, the mounting collar 22 can be manufactured to have a relatively low profile, while the cover 24 can be manufactured to have a relatively higher profile. In this embodiment, the mounting collar 22 is welded to the pipe 14 (the mounting collar/pipe weld joint is indicated by reference numeral 64). The cover 24 can then be attached to the mounting collar as discussed with respect to earlier figures, or can be welded to the mounting collar (the cover/collar weld joint is indicated by reference numeral 66). Leads 16 extend out from the cover 24 and may be attached to additional processing circuitry 18 (shown in FIG. 1).

Figure 5B:
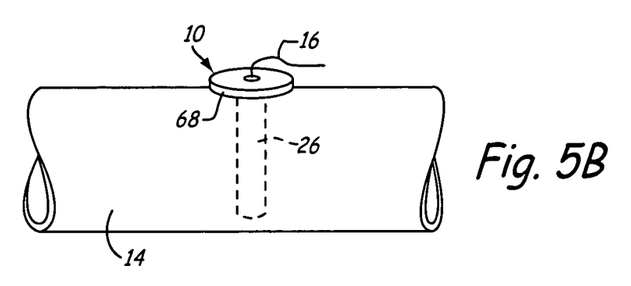

As shown in FIG. 5B, a flange element 68 can be used to attach the flow meter assembly to the pipe 14. In this embodiment, the flow meter assembly includes the shedding bar 26, the pressure bearing element 28, the sensor 12, and leads 16. As shown, the flange element 68 is circular; however, the flange element 68 may be of any shape or size to fit around the opening. The shedder bar 26 (shown in phantom) extends the entire diameter of the pipe, and leads 16 extend from the sensing element (not shown) out through the cover 24. Depending on the size of the sensor and the thickness of the wall of the pipe 14, there may be insufficient room for the processing electronics 18 (shown in FIG. 1) to be positioned within the attached assembly. Consequently, in certain circumstances, the leads 16 may extend from the sensing device 12 and may need to be shielded to guard against stray capacitances. processing electronics 18 may then be attached to the outside of the pipe 14 or may be connected at a location that is remote from the sensor assembly.

Figure 5C:
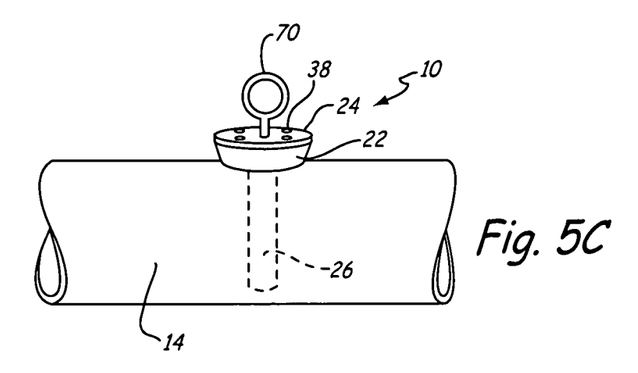

As shown in FIG. 5C, a gauge or dial 70 is attached to the outer surface of the cover 24, providing a user friendly display representative of a measured vortex frequency. In this embodiment, process circuitry 18 and a sensor element 12 may be positioned within the housing 20 of the vortex flow meter assembly 10, and the display can be adapted to indicate a fluid flow rate.

Figure 5D:
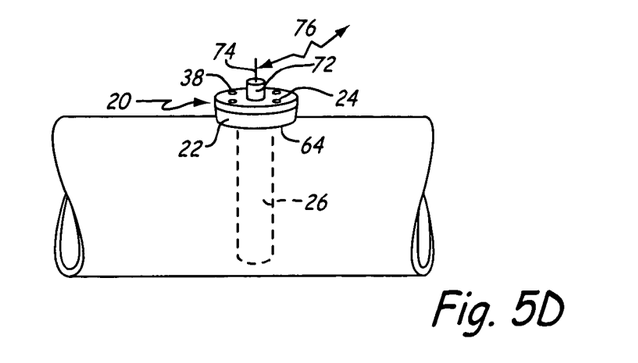

FIG. 5D shows another alternative embodiment of the present invention including a wireless transmitter 72 attached to the cover 24 of the flow meter assembly 10. In this embodiment, leads 16 extend from the sensor 12 (not shown), which senses the motion of the pressure bearing element 28 (not shown). Process circuitry 18 may be positioned within the housing 20 or on the cover 24 of the housing 20 to process the sensed data and to transmit the data wirelessly to a control center (not shown). The wireless transmitter 72 may also include an external antenna 74 for facilitating the sending and receiving of wireless signals 76. Finally, in this embodiment, the mounting collar 22 is welded to the pipe 14 (the mounting collar/pipe weld joint is indicated by reference numeral 64).

Figure 6A:
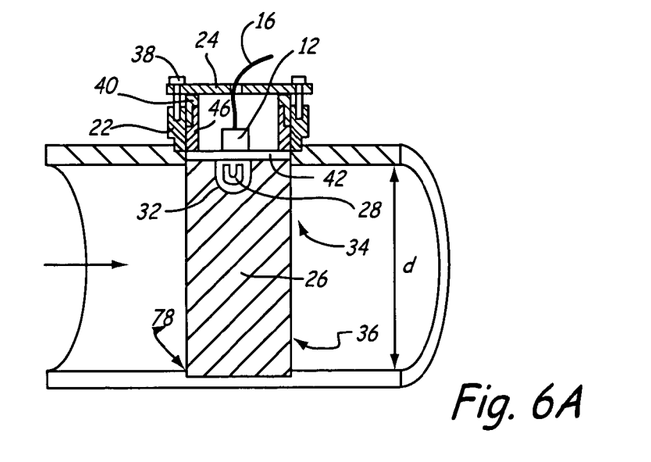
FIGS. 6A and 6B illustrate sectional views taken along lines 2—2 in FIG. 1, illustrating a reinforcement element on an inside wall of the pipe opposite the insertion opening.

Referring now to FIG. 6A, depending on the size of the diameter (d) of the pipe 14, and particularly for larger pipes having a high volume flow, it may be necessary to support the shedding bar at a distal end 36. As shown, the flow meter assembly 10 is inserted through an opening in the pipe 14. The mounting collar 22 is fixed to the surface of the pipe via weld 64. The main pressure bearing component 28 extends into a cavity 32 in the proximal end 34 of the shedder bar 26. The bearing element 28 is attached to a cap 42, which is held in place by a sensor housing 46 and a spacer 40, which are in turn held down by the cover 24. The cover 24 is attached to the mounting collar 22 by fasteners 38, which may be threaded screws, bolts, rivets or any other type of fastener. In this embodiment, the shedding bar 26 extends a full diameter (d) of the pipe 14 and into a recessed area 78 in the inner wall of the pipe 14. In general, any reinforcement element for the distal end 36 of the shedding bar 26 should be positioned approximately opposite the opening 44 on the inside wall of the pipe. In this embodiment, the reinforcement element is the recessed area 78, which is preferably positioned opposite the opening 44 in the pipe 14.

Figure 6B:
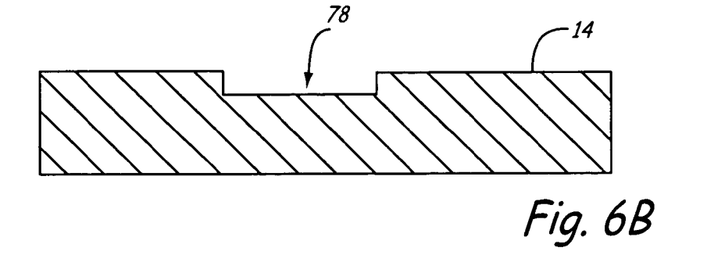

An expanded view of the recessed portion 78 of the pipe 14 is shown in FIG. 6B. Specifically, a recess 78 is machined in the inner surface of the wall of the pipe 14 on the side that is directly opposite to the opening 44. The recessed portion 78 is sized to receive the distal end 36 of the shedding bar 26.

Figure 7:
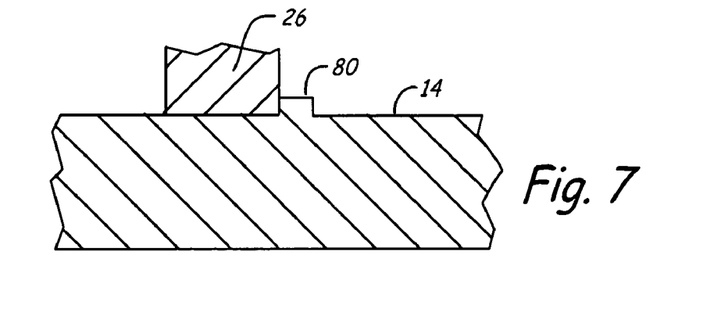

FIG. 7 shows an alternative embodiment of a reinforcing element 80 for supporting the shedding bar 26. As shown, the reinforcing element 80 is a notch or bump on the inner wall surface of the pipe 14 directly behind (relative to the direction of flow) the distal end 36 of the shedding bar 26. The reinforcing element 80 supports the shedding bar 26 against bending moments. Other reinforcing elements are also contemplated, such as a dimple sized to receive a protrusion on the distal end of the shedding bar 26 (see also, for example, reference numeral 46 and associated discussion in U.S. Pat. No. 4,717,159, which is incorporated herein by reference).

Figure 8A:
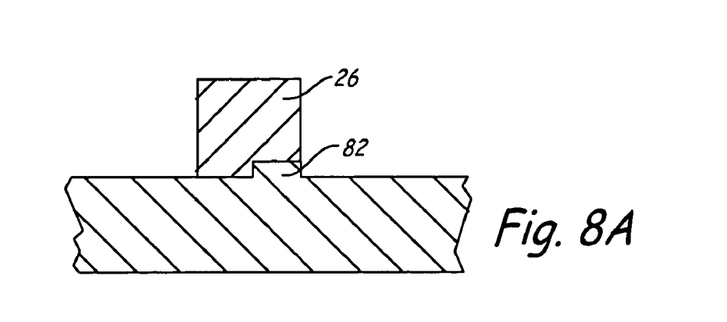
Figure 8B:
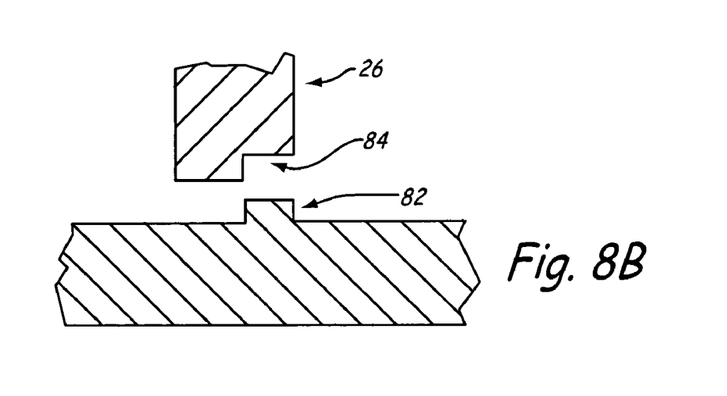

As shown in FIGS. 8A and 8B, a notch or ridge 82 is machined on the inner surface of the pipe 14 on the wall opposite the opening 44. The ridge 82 extends into the fluid flow, and is sized to match a corresponding recess 84 in the shedding bar 26. When the shedding bar 26 is positioned properly, the recess 84 mates with the ridge 82 to provide support for the distal end 36 of the shedding bar 26.

In FIGS. 9A–9D, an alternative embodiment of a support or reinforcing element is shown. In this embodiment, the support element 86 extends into the fluid flow from the surface of the inner wall of the pipe 14. The support element 86 is curved or "cupped" to receive the distal end 36 of the shedding bar 26.

Figure 9A:
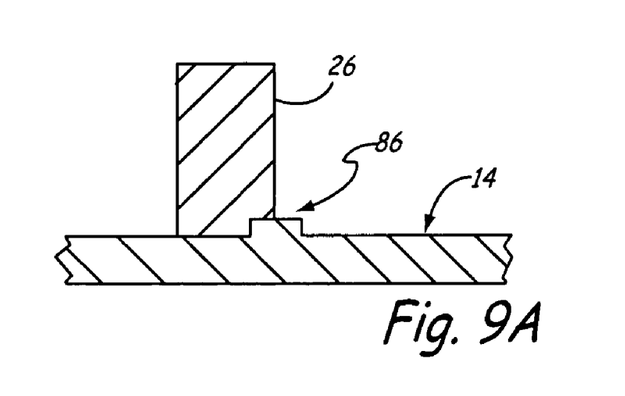
Figure 9B:
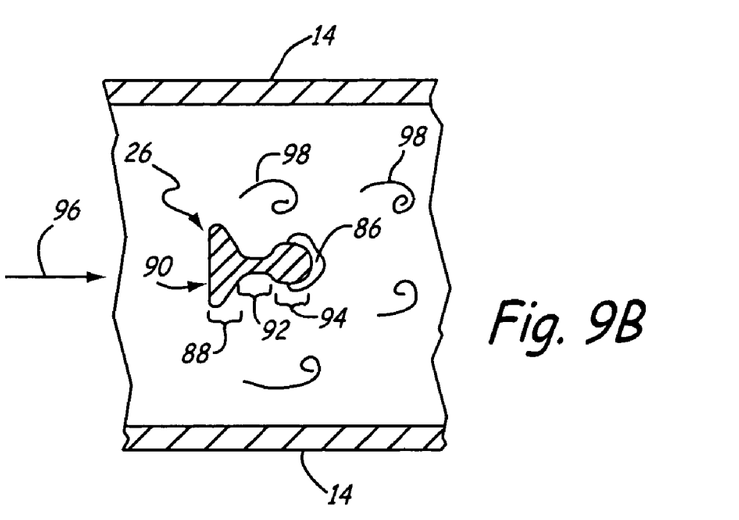

As shown in FIG. 9B, the shedding bar is divided into three distinct parts including a head section 88 having a flow face 90, an intermediate body section 92 that is integral with and immediately downstream from the head section 88, and a tail section 94 that is downstream from and integral with the intermediate body section 92. As shown, the support element 86 surrounds the tail section 94 of the shedding bar 26 along its distal end 34. The fluid flow direction is indicated by the arrow denoted by reference numeral 96, and the vortices caused by the shedding bar 26 are indicated by reference number 98.

Figure 9C:
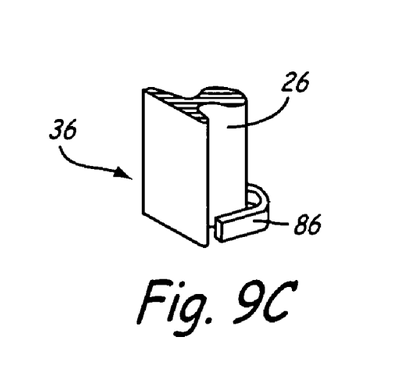

FIG. 9C illustrates the shedding bar 26 in position within the curved area of the support element 86. The support element 86 extends from the surface of the pipe 14 and cups the distal end 36 of the shedding bar 26.

Figure 9D:
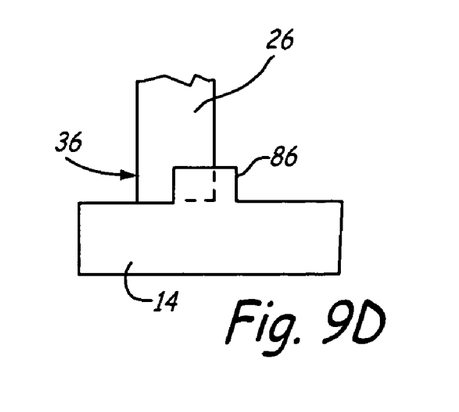

FIG. 9D illustrates that the shedding bar 26 extends to the surface of the pipe 14 within the curvature of the support element 86. The portion of the distal end 36 of the shedding bar 26 that is within the curved support element 86 is shown in phantom behind the supporting element 86.

In general, the pressure bearing element or main pressure bearing component 28 is classified as a category 11, 111, or IV pressure accessory according to the European Pressure Equipment Directive 97/23/EC. Both sides of the pressure bearing element are identically machined.

In general, the insertion vortex meter of the present invention is designed to work on larger diameter pipes, such as 12 inch pipes or larger. While the invention can be used with smaller pipes, generally the cost advantage of doing so may be too small, and the installation process with a smaller pipe may be less efficient, depending on the specific implementation. In other words, with smaller diameter pipes, the insertion vortex flow meter may be neither economical nor desirable. However, depending on the size, and particularly with larger sizes such as pipes having six-inch diameter or larger, the present invention provides significant cost savings in materials for the parts. Specifically, the large amounts of steel that go into a standard vortex meter body can be replaced by the smaller assembly of the insertion vortex flow meter of the present invention.

In general, the vortex flow meter of the present invention can be installed as described above, or in any of the ways that ANNUBARS that are currently installed. Thus, the vortex flow meter can be installed using a simple flange mounted to the pipe, using a mounting ring or collar as discussed above, or using a mounting apparatus or assembly. Suitable mounting assemblies include the PAK-LOK system shown in U.S. Pat. No. 4,717,159 which is incorporated herein by reference, the flow-tap method shown in U.S. Pat. No. 4,633,713, or other similar pipe mounting systems or techniques.

In general, the present insertion vortex assembly solves the problem of high cost of the prior art. By using the insertion technique, the present invention replaces two large flanges and a meter body with one smaller assembly.

All insertion meters have the cost advantage of not having two flanges and a meter body for attachment between two pipe sections. This cost advantage explains why insertion-type meters are desirable for larger pipe size applications, in part because the flanges and the meter body require more metal for larger pipe sizes, thereby increasing the unit costs. The advantage of the design of the present invention over other types of meters is that the averaging effect of the vortex shedding bar extending across the entire diameter of the pipe makes the insertion vortex flow meter as accurate as a vortex meter in a traditional meter body.

Finally, the vortex flow meter assembly 10 of the present invention may be scaled fairly simply. By machining the assembly as separate component elements, components can be replaced or substituted as needed. More importantly, increasing the size of the insertion vortex meter simply requires machining of a larger shedding bar 26. The other component elements can be used with other sized bars with little alteration. Importantly, this allows for the same component architecture to be manufactured to scale with little or no adjustment over are wide range of line sizes, approximately 4 inch diameter pipes to 24 inch or larger pipes. Thus, the vortex flow meter assembly 10 of the present invention provides a scalable, efficient, and cost effect alternative to standard meter body vortex meters.

Although the present invention has been described with reference to preferred embodiments, workers skilled in the art will recognize that changes may be made in form and detail without departing from the spirit and scope of the invention.

What is claimed is:

1. An insertion vortex flow meter for measuring a flow rate of a process fluid in a pipe, comprising:
    a conduit having a wall surrounding a bore for carrying a fluid along a bore axis, the wall having an opening extending entirely through the wall;
    a shedding bar disposed within the conduit to induce disturbances in the process fluid, the shedding bar extending from the opening into the bore and to an opposing wall of the conduit;
    a pressure bearing element coupled to the shedding bar and adapted to move in response to the disturbances in the fluid at a frequency indicative of the flow;

a sensor housing contacting the pressure bearing element; and a mounting apparatus positioned around the opening and surrounding said sensor housing and coupled to the conduit; the mounting apparatus adapted to apply a compressive force to the sensor housing to secure the shedding bar and the pressure bearing element in place.

2. The insertion vortex flow meter of claim 1 and further comprising:
a reinforcement element disposed on the opposing side wall of the pipe and sized to interface with a distal end of the shedding bar.

3. The insertion vortex flow meter of claim 1 wherein the mounting apparatus further comprises:
a mounting collar fixedly attached to the surface of the pipe; and
a mounting cover releasably attached to the mounting collar and adapted to apply the compressive force to the sensor housing during operation.

4. The insertion vortex flow meter of claim 3 wherein the mounting collar has threaded openings and the mounting cover has fastener openings, and wherein the mounting cover is releasably attached to the mounting collar with threaded fasteners extending through the fastener openings and into the threaded openings of the mounting collar.

5. The insertion vortex flow meter of claim 1, further comprising:
a sensor coupled to the pressure bearing element and adapted to sense motion of the pressure bearing element.

6. The insertion vortex flow meter of claim 5 wherein the sensor is adapted to generate an output based on the sensed motion, the output being indicative of a volumetric flow rate.

7. An averaging insertion vortex flow meter for measuring fluid flow, comprising:
a conduit having a wall surrounding a bore for carrying a fluid along a bore axis, the wall having an opening extending entirely through the wall;
a shedding bar extending from the opening into the bore, the shedding bar contacting an opposing wall of the conduit at a distal end, the shedding bar for causing disturbances in the fluid;
a pressure bearing element extending from the opening and adapted to move in response to the disturbances in the fluid at a frequency indicative of the flow; and
a mounting apparatus disposed adjacent the opening in the conduit, the mounting apparatus for attaching to the conduit; the mounting apparatus comprising:
a mounting collar around the opening;
a sensor housing positioned within the mounting collar and in contact with the pressure bearing element; and
a detachable cover releasably attached to the mounting collar and adapted to apply a compressive force to the sensor housing for holding the shedding bar and the pressure bearing element in place.

8. The flow meter of claim 7 wherein the sensor housing translates the compressive force to the shedding bar to hold the shedding bar in position against the opposing wall.

9. The flow meter of claim 7 wherein the mounting collar comprises:
a cylindrical mounting collar sized to fit the opening, the mounting collar having an end that is contoured to match a curvature of the conduit; and
wherein the detachable cover is sized to fit over the mounting collar and adapted to attach to the mounting collar.

10. The flow meter of claim 7 wherein the mounting apparatus is welded to the conduit.

11. The flow meter of claim 7 and further comprising:
a sensing device coupled to the pressure bearing element, the sensing device adapted to sense motion of the pressure bearing element.

12. The flow meter of claim 11 wherein a frequency of the sensed motion is a function of a volumetric flow rate of the fluid flow.

13. The flow meter of claim 7 and further comprising:
a sensor coupled to the pressure bearing element for sensing motion of the pressure bearing element and for providing an output indicative of the flow.

14. The flow meter of claim 7 and further comprising:
processing circuitry for calculating a flow rate of a fluid based on the output of the sensor.

15. The flow meter of claim 7 wherein the shedding bar, the pressure bearing element, and a sensor housing are cast as a single solid unit.

16. The flow meter of claim 7 and further comprising:
a temperature sensor close-coupled to a surface of the pipe for measuring a fluid temperature.

17. The flow meter of claim 16 and further comprising:
processing circuitry for calculating a flow rate of a fluid based on an output of a sensor coupled to the pressure bearing element and based on a sensed temperature measured by the temperature sensor.

18. The flow meter of claim 7 and further comprising:
a pressure sensor close-coupled to a surface of the pipe for measuring a fluid pressure.

19. The flow meter of claim 18 wherein the reinforcing element is a recess on a surface of the opposing wall.

20. The flow meter according to claim 7 and further comprising:
a reinforcing element positioned on the opposing wall of the conduit and sized to receive the distal end of the shedding bar.

21. A component assembly of a vortex flow meter for measuring a flow of a fluid within a conduit, comprising:
a mounting structure attached to a surface of the conduit adjacent a hole extending through a wall of the conduit; and
a vortex flow meter attached to the mounting structure comprising:
a shedding bar extending approximately a full diameter of the conduit;
a pressure bearing element coupled to the shedding bar and having a pivoting member and a cap attached to the pivoting member, the pivoting member moving in response to disturbances within the fluid at a frequency indicative of the flow;
a pressure sensor assembly having a sensor physically connected to the pressure bearing element for sensing the motion of the pivoting member; and
a sensor housing adapted to house the pressure sensor assembly, the sensor housing in contact with the cap;
wherein the mounting structure applies a compressive force to the sensor housing to hold the the shedding bar and the pressure bearing element in place during operation.

22. The component assembly of claim 21 wherein the mounting structure comprises:
a mounting collar sized to fit around the hole, the mounting structure having a substantially cylindrical shape, the mounting collar provided with openings sized to receive a fastener;

a cover sized to fit over the mounting collar, the cover having fastener openings corresponding to the openings on the mounting collar; and fasteners for tightening the cover onto the mounting collar.

23. The component assembly of claim 21 wherein a connection between the sensor and the pressure bearing element is mechanical.

24. The component assembly of claim 21 wherein the mounting structure includes a mounting collar and a cover, and further comprising:

a spacer sized to fit at least partially into the mounting collar and adapted to mate with the sensor housing such that the cover rests on the spacer when the cover is placed over the mounting collar.

\* \* \* \* \*